April 29, 1969   A. W. SNOOK   3,440,927
GEAR CUTTING MACHINE WITH INTERMITTENT INDEXING MECHANISM
Filed March 13, 1967

INVENTOR.
ALVIN W. SNOOK
BY Richard W. Treverton
ATTORNEY

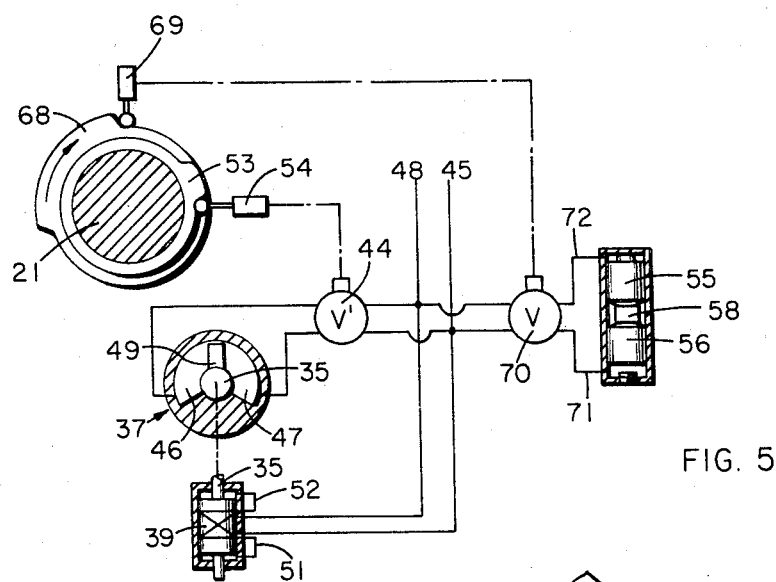
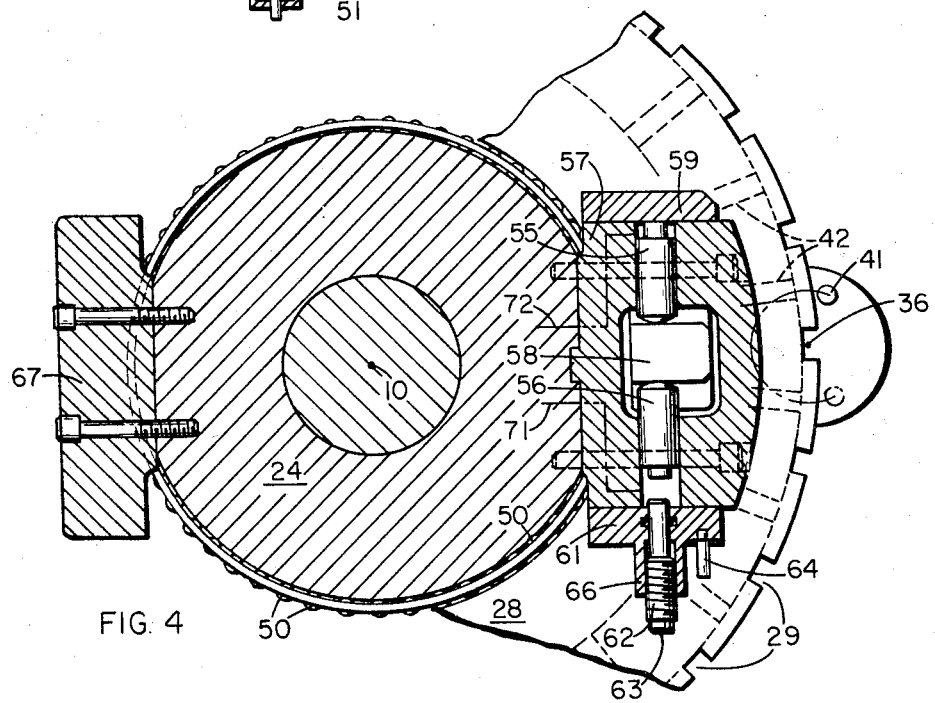
FIG. 5
FIG. 4

United States Patent Office 3,440,927
Patented Apr. 29, 1969

3,440,927
GEAR CUTTING MACHINE WITH INTERMITTENT INDEXING MECHANISM
Alvin W. Snook, Rochester, N.Y., assignor to The Gleason Works, Rochester, N.Y., a corporation of New York
Filed Mar. 13, 1967, Ser. No. 622,731
Int. Cl. B23f 9/10, 1/06
U.S. Cl. 90—5          6 Claims

ABSTRACT OF THE DISCLOSURE

A gear cutting machine has a rotary cutter with two groups of blades which cut in succession on the opposite sides of the tooth slots. An index mechanism angularly advances an index plate on the work spindle of the machine by one gear tooth pitch just before each cut by the first group of blades, so that the cutter during successive revolutions cuts in successive slots. An hydraulically actuated device rotates the work spindle back and forth relative to the index plate through a fraction of a tooth pitch, each forward rotation occurring just before cutting by one group of blades and each return rotation occurring just before cutting by the other group of blades. The angle through which the device rotates the spindle is adjustable to vary the taper of the slots.

---

The invention relates to a gear cutting machine and particularly to an improvement in the indexing mechanism thereof.

In a machine of a known type the cutter has two groups of blades which cut in succession on opposite sides of the tooth slots of a work gear. After each revolution of the cutter the gear is indexed so that on successive turns the cutter acts in successive tooth slots. Also the gear is indexed between the cutting by the first group of blades and the cutting by the second group of blades, so that the tooth slot is in a different relation to the cutter for the cutting of one side of each slot than for the cutting of the other side. By this different relation, the tooth slots may be made to taper, their opposite sides being made to converge from the outer to the inner ends of the slots, whereas when both sets of blades act while the cutter axis and work gear are in the same relation the opposite tooth sides will necessarily be concentric surfaces of revolution.

In Patent No. 3,283,659 granted to E. Stark, a machine of this kind has an index mechanism which indexes the work gear twice per cutter revolution, each index being by one-half tooth pitch and one such index being effected just before each group of blades begins to cut. In an earlier patent No. 2,284,636 granted to L. O. Carlsen, a similar effect is obtained by an index mechanism which includes a notched index plate on the work spindle and a holding pawl therefor. The mechanism is actuated once per cutter revolution, just before cutting by the first of two groups of cutter blades, so that the cutter on successive revolutions cuts in successive tooth slots. The holding pawl is shifted back and forth, relative to its support, to thereby rotate the index plate and work spindle back and forth, the forward and return rotations occurring, respectively, just prior to cutting by one and by the other of the two groups of blades. This shifting of the pawl is effected by a cam, and hence the indexing angles depend upon the throw of the cam. By substituting a cam of different throw the taper of the tooth slots can be changed.

The present invention has among its objects the provision of an indexing mechanism of the type having an index plate and a holding pawl therefor, and having the capability of successive indexing actions through different angles as in Patent No. 2,284,636, but in which the pawl is required to have no motion other than to engage and disengage the plate, to thereby improve the accuracy and reliability of the mechanism. Another object is to provide such a mechanism which has the capability of being adjusted to vary the angle of back-and-forth indexing motion, without exchange of cams or other machine elements, so that tooth slots of any desired taper may be cut.

A more specific objective, in a machine having a housing with a spindle rotatable therein, an index plate on the spindle having equally spaced around its periphery a plurality of index formations, a positioning pawl movable on the housing to engage and disengage said formations, and actuating means for intermittently disengaging said pawl from one index formation, angularly advancing the plate, and then re-engaging said pawl with a succeeding index formation to thereby intermittently index said spindle, is the improvement of said plate being rotatable on the spindle and the provision of a fluid pressure operated device arranged to act between the plate and the spindle for rotating the latter back and forth relative to the plate, and means for operating said device in time with operation of said actuating means. Preferably means are provided for adjusting the angle through which the spindle is rotatable back and forth relative to the plate.

A preferred embodiment of the invention will now be described with reference to the accompanying drawings, wherein:

FIG. 4 is a cross section in plane 4—4 of FIG. 3; and,

FIG. 5 is a diagram of the electro-hydraulic control system for the index mechanism.

Figures 1, 2:
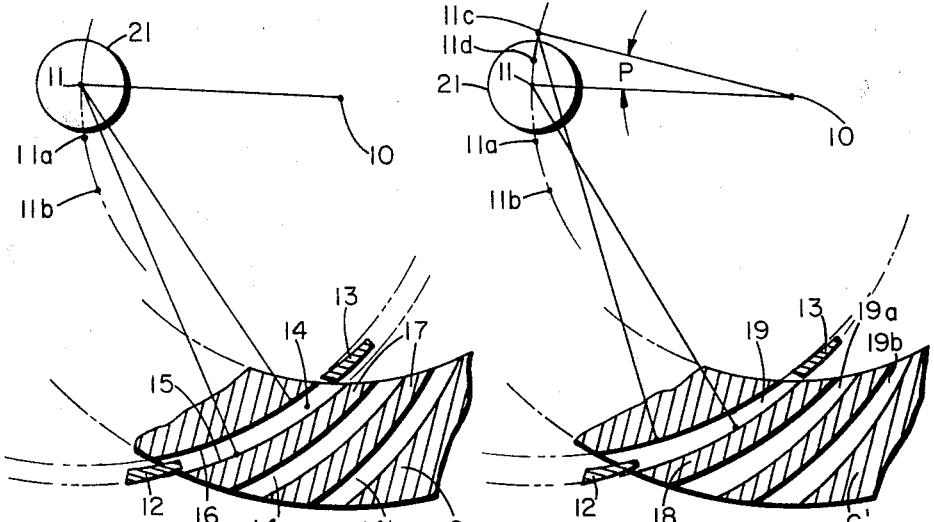
FIGS. 1 and 2 are diagrams illustrating how variation of in the angle of successive index operations affects tooth slot taper.

The effect of the invention will first be explained with reference to the diagrams, FIGS. 1 and 2. When a gear G, FIG. 1, whose axis is at 10, is cut with a cutter rotating about axis 11 and having a group of outside cutting blades 12 and a group of inside cutting blades 13 (only one blade of each group being shown in the diagram) a tooth slot 14 is produced whose opposite sides 15 and 16 are coaxial surfaces of revolution. The slot is therefore of substantially constant width from end to end in the case where it is of substantially constant depth from end to end. The same is true of preceding slots 14a and 14b, which have been cut when the cutter axis has been respectively at 11a and 11b. Unless the cutter is of much smaller diameter than is conventional, the gear teeth 17 are substantially tapered, as shown.

FIG. 2 illustrates a case which is the opposite of that shown in FIG. 1 insofar as concerns taper. Here the teeth 18 of gear G are of constant thickness from end to end, and all of the taper is applied to the slots. To accomplish this the cutter axis is positioned at 11 while outside blade 12 is cutting in slot 19, but is shifted (relative to gear G′) to position 11c just before blade 13 begins to cut in the same slot. The angle 11–10–11c represents one tooth pitch P of the gear. The two sides of the preceding slot, 19a, have been cut by blades 12 and 13 when the cutter axis has been respectively at 11a and 11, and preceding slot 19b when the cutter axis has been respectively at 11b and 11a.

Intermediate of the two extremes shown in FIGS. 1 and 2, is a case where the cutter axis is placed at 11, FIG. 2, while blade 12 is cutting, and at 11d midway between 11 and 11c) when blade 13 is cutting. This will produce tooth slots whose taper equals the taper of the adjacent teeth. Gears cut in accordance with aforementioned Patent No. 3,283,659 are of this form. It may be mentioned that each of these three cases, the two extreme and the intermediate, requires that at least one of the two groups of cutter blades be set at a somewhat different relative radial distance from the cutter axis 11 than in the other two cases. For example, with blades 12 in FIGS. 1 and 2 both at the same distance from the cutter axis, the blade 13 in FIG. 2 is farther from the cutter axis than is the blade 13 in FIG. 1, although in the two cases the average tooth slot width is about the same.

Inasmuch as the variation in slot taper illustrated in FIG. 1 and 2 is obtained by indexing about axis 10 of the work gear, it is of course immaterial in principle whether the indexing is by rotation of the cutter axis about the work gear axis, or by rotation of the work gear in the opposite direction about its own axis, the latter being the method employed in using the present invention.

The index mechanism herein disclosed is capable of adjustment to provide a gear tooth slot taper of either extreme shown in FIGS. 1 and 2 or of any intermediate degree of taper between these extremes. The taper of the teeth of a pinion which is generated to mate with the gear will, of course, correspond to the taper of the tooth slots of the gear. Accordingly the capability of adjustment provided by the present invention affords the designer of a pair of gears complete freedom of choice in the division of taper between the gear and pinion teeth, enabling design of the pair to be optimized, for example for strength and durability.

The gear cutting machine may have the same general configuration as that shown in patent No. 3,054,332 granted to H. A. Male. It may also have the same means as the patent for adjusting the housing (not shown) for the cutter spindle 21, FIGS. 1 and 2 hereof, relative to the work spindle housing 22, FIG. 3, to accommodate work gears of different sizes and designs. The cutter may be generally similar in design to that disclosed in aforementioned Patent No. 3,283,659.

Figure 3:
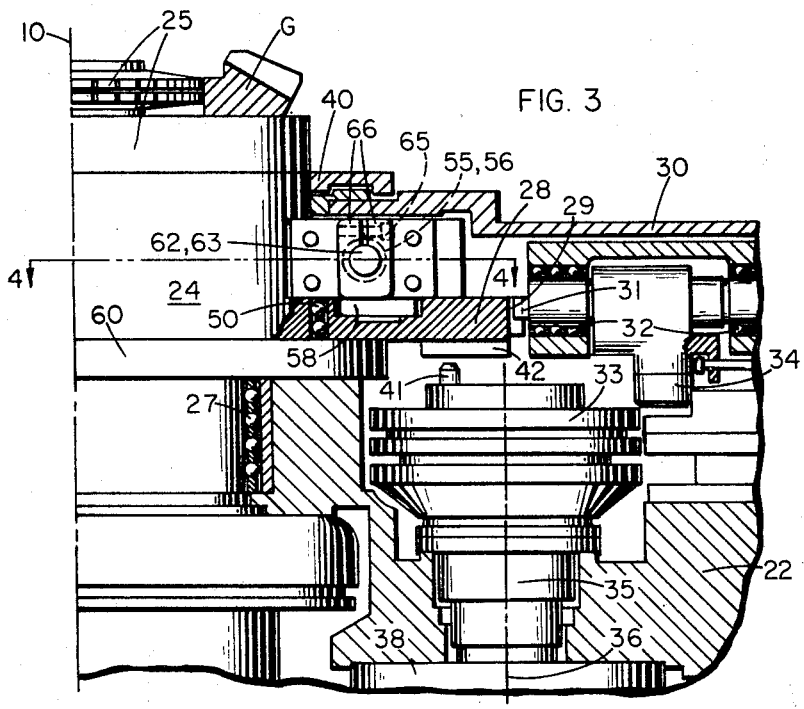
FIG. 3 is a fragmentary section through the indexing mechanism in a plane containing the work spindle axis.

Referring to FIG. 3 hereof, the work gear G is chucked on work spindle 24 by a suitable work holder 25, the spindle being rotatable in housing 22, about axis 10, on antifriction bearing means 27. Such rotation, for effecting tooth-to-tooth indexing of the work gear, is effected by an indexing mechanism comprising an index plate 28 on the work spindle. The plate has about its periphery a plurality of notches 29 (see also FIG. 4) corresponding in number to the tooth slots of the work gear. An index locating and holding pawl 31 successively engageable in the notches 29 is slidable in the housing 22 on bearings 32. The pawl is engaged with the index plate by a spring, not shown, and is disengaged by a cam 33 which periodically engages a follower roller 34 carried by the pawl.

The cam 33 is mounted on a shaft 35 journaled in the housing 22 for back and forth rotation about its axis 36. This rotation is effected by a vane-type hydraulic motor 37, FIG. 5, mounted in part 38, FIG. 3, of housing 22. Shaft 35 is also reciprocable along axis 36 by hydraulic pressure applied to the ends of piston-valve 39 affixed to it and slidable in a cylinder in housing part 38. A drive pin 41 on shaft 35, eccentric of axis 36, is engageable successively in radial slots 42 in the underface of the index plate when the shaft has been elevated to its uppermost position by the piston-valve. Such elevation of the shaft also brings the cam 33 to the same horizontal level as roller 34. The slots 42 correspond in number to the notches 29. A cover section 30 of the housing 22 cooperates with a labyrinth sealing ring 40 on the spindle 24 to exclude cutting chips and the like from the interior of the housing.

The indexing mechanism insofar as described in the preceding paragraph is essentially like that disclosed in Patent No. 3,166,954 granted to N. W. Fowler et al. Referring primarily to FIG. 5 hereof, the mechanism operates as follows:

While blades 12 and 13 are cutting, a solenoid valve 44 directs pressure from hydraulic pressure line 45 to chamber 46 of motor 37 and connects chamber 47 of the motor to hydraulic return line 48. Pressure therefore holds the vane piston 49 of the motor and shaft 35 in their clockwise limit position wherein index drive pin 41, FIG. 4, is clear of the adjacent slot 42 of index plate 28. In this position the piston-valve 39, whose form and operation are described in detail in aforementioned Patent 3,166,954, directs pressure from line 45 through passage 51 to the chamber beneath the piston-valve and connects the chamber above the piston-valve through passage 52 to return line 48. The pressure acts to hold the piston-valve and shaft 35 in their upper limit position wherein cam 33 is at the same level as roller 34, FIG. 3, and pin 41 is at the same level as slot 42.

After both sets of blades 12 and 13 have cut one tooth slot and are clear of the work gear (by reason of a gap between the last first blades of the cutter) the lobe of a cam 53 on cutter spindle 21 operates a switch 54 causing solenoid valve 44 to reverse motor 37 by applying pressure to chamber 47 and placing chamber 46 on exhaust. The vane piston 49 therefore rotates shaft 35 counter-clockwise, causing the cam 33, FIG. 3, to act against roller 34, releasing pawl 31 from the index plate, and to then swing the pin 41, FIG. 4, to its broken line position, turning the index plate by one pitch. During the latter part of this motion of the vane piston the cam 33 allows spring-backed pawl 31 to reengage the index plate, and the piston valve 39 reverses the pressure to its upper and lower chambers by connecting passages 51 and 52 respectively to return line 48 and pressure line 45. This causes the piston-valve and shaft 35 to lower, moving pin 41 below the plane of slots 42, FIG. 3, and cam 33 below the plane of roller 34.

The continuing rotation of the cutter spindle 21 moves the lobe of cam 53 past the switch 54 which thereupon again reverses solenoid valve 44, causing the vane piston 49 and shaft 35 to turn counterclockwise, and during the latter part of this motion the piston-valve 39 again reverses the pressure and exhaust connections to passages 51 and 52, causing the piston-valve and shaft 35 to move to their upper limit position, thereby completing the indexing cycle.

In the mechanism of the present invention, the work spindle 24 and index plate 28, instead of being ragidly connected as in the prior machine, are relatively rotatable on a ball-sleeve bearing 50, FIGS. 3 and 4. The spindle is rotatable back and forth relative to the plate by pistons 55 and 56, FIGS. 3 and 4, which are reciprocable in cylinder bores in a cylinder block 57 secured to the spindle, the inner ends of the pistons abutting a finger 58 that is rigidly secured to and projects upwardly from the index plate. The cylinder bore for piston 55 is closed by a cylinder head 59 and the bore for piston 56 by a cylinder head 61. To the latter is adjustably screw-threaded a pin 62 which is adapted for abutment by piston 56 and, together with head 59, limits the travel of the pistons.

Adjustment of pin 62 is made with the aid of a micrometer gage, not shown, that is adapted to seat against end face 63 of the pin and against a pin 64 secured to cylinder head 61. After being adjusted the pin 62 is secured by tightening a clamp screw 65, FIG. 3, which extends through the bifurcated screw-threaded portion 66 of cylinder head 61. The range of adjustment of pin 62 is preferably such that at one extreme the pistons 55, 56 and finger 58 are clamped to the cylinder block 57, so that the index plate is held against rotation relative to the spindle, and at the other extreme the pistons can move the finger 58 far enough to rotate the spindle back and forth relative to the index plate by at least one tooth pitch of the largest pitch gears for which the machine is designed. Also preferably, a counter-weight 67 is secured to the side of the spindle 24 diametrically opposite to the cylinder block 57 to balance the mass represented by the block and piston assembly. The counter-weight 67 and the cylinder block 57 lie immediately above the index plate 28 and act as gibs to prevent tilting of the plate upon the flange 60 of the spindle upon which the plate rests.

Referring primarily to FIG. 5, during operation of the machine, at the same time that the lobe of cam 53 contacts switch 54 to effect an indexing cycle, the lobe of another cam, 68, on the cutter spindle 21 contacts a switch 69, which thereupon actuates solenoid valve 70 to apply hydraulic pressure from line 45 through passage 71 to the cylinder chamber at the outer end of piston 56, and to connect passage 72, which leads from the chamber at the outer end of piston 55, to the return line 48. Consequently the pistons act against finger 58 to move the spindle 24 and work gear G clockwise in FIG. 4 relative to the index plate. Outside cutter blades 12 then cut the concave sides of the tooth slots and pass clear of the work gear. Then, before inside blades 13 begin to cut, the lobe of cam 68 passes out of contact with switch 69, causing valve 70 to again reverse, connecting passage 72 to pressure and passage 71 to exhaust. This causes pistons 55, 56 to move the work spindle and work gear, counterclockwise in FIG. 4, relative to the index plate. Immediately thereafter inside blades 13 cut the convex sides of the tooth slot. After the last blade 13 has left the tooth slot, and before the first blade 12 again returns to cutting position, the indexing cycle hereinbefore described is repeated, by the lobe of cam 53 contacting switch 54 and the lobe of cam 68 contacting switch 69, so that the index plate 28 is indexed by one pitch and the spindle 24 and work gear are rotated clockwise relative to the index plate.

Depending upon the adjustment of pin 62, FIG. 4, the rotation of the work spindle relative to the index plate described in the preceding paragraph may be of any magnitude from zero to the maximum (preferably at least one tooth pitch), with the effect that has been described in connection with FIGS. 1 and 2. The passages 71 and 72 include communicating passage sections drilled in housing 22, spindle 24 and cylinder block 57. For convenience of illustration these drilled passage sections are indicated only by broken lines 71 and 72 in FIG. 4.

Having now described the preferred embodiment of my invention, its mode of operation and its effect, what I claim is:

1. A gear cutting machine or the like having a housing with a spindle rotatable therein, an index plate on the spindle having equally spaced around its periphery a plurality of index formations, a positioning pawl movable on the housing to engage and disengage said formations, and actuating means for intermittently disengaging said pawl from one index formation, angularly advancing the plate, and then reengaging said pawl with a succeeding index formation, to thereby intermittently index said spindle, wherein the improvement comprises said plate being rotatable on the spindle, means operated by fluid pressure arranged to act between the plate and the spindle for rotating the latter back and forth relative to the plate, and means for operating said fluid pressure operated means in time with operation of said actuating means.

2. A machine according to claim 1 having means for adjusting the angle through which the spindle is rotatable back and forth relative to the plate.

3. A machine according to claim 1 in which said means operated by fluid pressure comprises a cylinder block having a pair of opposed pistons reciprocable therein, and a member disposed between said piston for movement thereby upon reversal of fluid pressure against the pistons, one of said block and said member being secured to the spindle and the other one of them being secured to the plate.

4. A machine according to claim 3 in which there is an adjustable abutment for one piston, to limit the stroke thereof in the cylinder block and thereby adjust the angle through which the spindle is rotatable back and forth relative to the plate.

5. A machine according to claim 1 wherein said spindle is adapted to support a workpiece and there is a cutter spindle adapted to support a rotary cutter which has therearound two groups of blades for respectively cutting on the opposite tooth sides of such workpiece, the machine further comprising means for coordinating operation of said actuating means and said device with the rotation of the cutter spindle, to cause the indexing of the work spindle and rotation of the latter relative to the index plate to occur just prior to cutting of the workpiece by one group of blades, and return rotation of the work spindle relative to the index plate to occur just prior to cutting of the workpiece by the other group of blades.

6. A machine according to claim 5 wherein there is a means for adjusting the magnitude of said rotation and return rotation of the work spindle relative to the index plate, to thereby vary the tape of the tooth slos of the workpiece.

References Cited
UNITED STATES PATENTS

| | | | |
|---|---|---|---|
| 2,284,636 | 6/1942 | Carlsen | 90—5 |
| 3,166,954 | 1/1965 | Fowler et al. | 74—822 |
| 3,283,659 | 11/1966 | Stark | 90—5 |

ANDREW R. JUHASZ, *Primary Examiner.*

G. WEIDENFELD, *Assistant Examiner.*

U.S. Cl. X.R.

90—9.4